United States Patent [19]

Ekelöf et al.

[11] Patent Number: 5,166,495
[45] Date of Patent: Nov. 24, 1992

[54] METHOD AND APPARATUS FOR AUTOMATIC MULTI-RUN WELDING

[75] Inventors: Bengt Ekelöf, LaxÅ; Peder Hansson, Finnerödja, both of Sweden

[73] Assignee: ESAB Aktiebolag, Gothenberg, Sweden

[21] Appl. No.: 815,807

[22] Filed: Dec. 30, 1991

Related U.S. Application Data

[62] Division of Ser. No. 580,378, Sep. 10, 1990, Pat. No. 5,107,093.

[30] Foreign Application Priority Data

Sep. 11, 1989 [SE] Sweden .............. 8902963-1

[51] Int. Cl.$^5$ .................................. B23K 9/127
[52] U.S. Cl. .................................. 219/124.34
[58] Field of Search ............ 219/124.34, 125.12, 219/137 R

[56] References Cited

U.S. PATENT DOCUMENTS

| | | | |
|---|---|---|---|
| 4,491,718 | 1/1985 | Cook et al. | 219/124.22 |
| 4,493,968 | 1/1985 | Brown | 219/124.34 |
| 4,563,745 | 1/1986 | Panzeri | 364/477 |
| 4,590,355 | 5/1986 | Nomura et al. | 219/125.12 |
| 4,591,689 | 5/1986 | Brown et al. | 219/124.34 |
| 4,608,481 | 8/1986 | Nomura et al. | 219/125.12 |

FOREIGN PATENT DOCUMENTS

| | | | |
|---|---|---|---|
| 0012962 | 7/1980 | European Pat. Off. | |
| 50-8703 | 4/1975 | Japan | 219/124.34 |
| 60-99485 | 6/1985 | Japan | |
| 60-133979 | 7/1985 | Japan | 219/124.34 |
| 61-67568 | 4/1986 | Japan | 219/124.34 |
| 61-279368 | 12/1986 | Japan | |

Primary Examiner—Clifford C. Shaw
Attorney, Agent, or Firm—Nils H. Ljungman

[57] ABSTRACT

This invention relates to a method and apparatus for automatic multi-run welding of a joint such as a square butt joint, a V-type joint, or a U-type joint, etc. This invention incorporates a sensor which moves along the joint and which scans a number of points along portions of the joint. The points scanned are used to calculate the cross-sectional area of the portions of the joint and the cross-sectional areas are then used to determine welding parameters, such as weld speed and weld rod feed, for welding which is to be done in each of the joint portions. Thus, the joint is filled with weld material uniformly along its length despite deviations which may be inherent in the edges of the materials which are being welded.

20 Claims, 7 Drawing Sheets

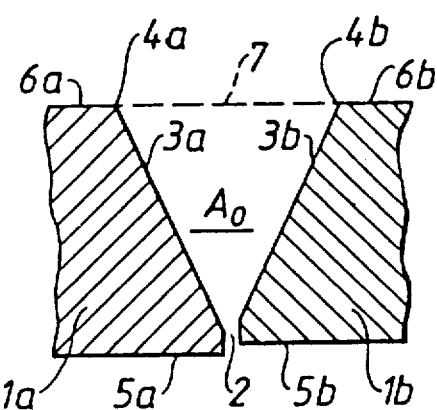
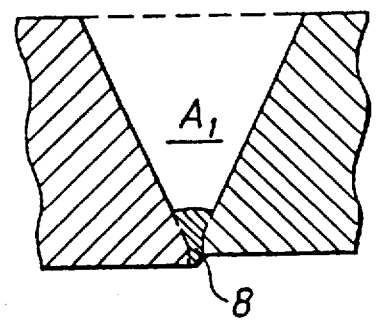
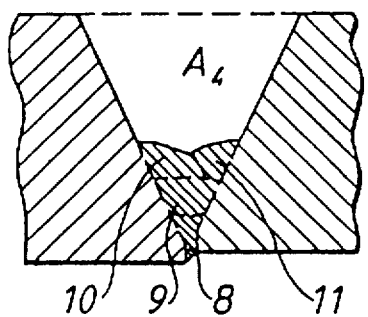
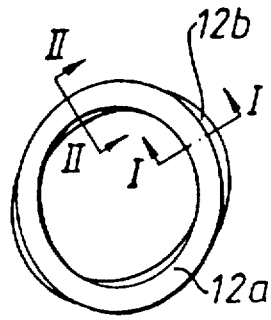
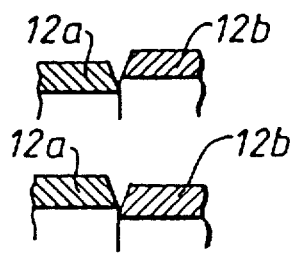
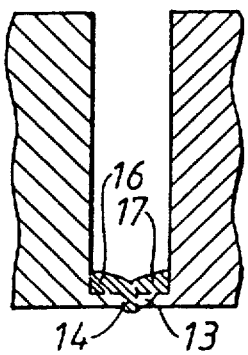
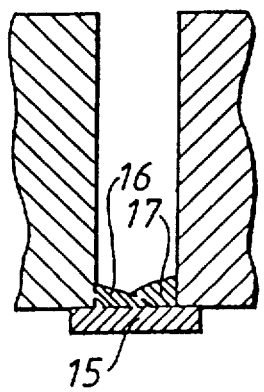

METHOD AND APPARATUS FOR AUTOMATIC MULTI-RUN WELDING

This is a divisional application of Ser. No. 07/580,378, filed on Sep. 10, 1990 now U.S. Pat. No. 5,107,093.

BACKGROUND OF THE INVENTION

1. Field of the Invention

The invention relates to a method and the apparatus for automatic multi-run welding of a joint formed by two joint surfaces, in which method the contour of the joint is scanned by a sensor which emits signals corresponding to the shape of the joint, which signals, after evaluation, control the deposition of the weld beads by means of a continuously fed electrode which is movable in at least three directions, is directed towards a welding point in the joint by means of an arc weld head and is moved relatively along the joint.

In welding, account must be taken of the variations in the cross-sectional area of the weld joint along the joint. The cross-sectional area is determined, on the one hand, by the contour of the joint and, on the other hand, by a line which connects the two joint edges. The cross-section of the joint often differs from the ideal shape, for example a V-shape, U-shape etc. In the case of long joints, the width of the joint usually varies, and the joint edges are often offset relative to each other. The cross-sectional area along the joint therefore alters continuously on account of the geometric imperfections of the joint, which are essentially caused by production-engineering in the joint preparation. In automatic welding in particular, it must be possible for these variations in the joint cross-section along the joint to be recorded, so that the beads can be deposited with a chosen amount of welding material per unit of length, which finally results in a joint which is even and filed to the same level. In manual or semi-automatic welding, the welder can vary the welding parameters, for example the welding speed, in order to compensate for irregularities in the weld joint. In the case of automatic welding, such adaption of the welding to these variations must be effected entirely automatically.

2. Description of the Prior Art

EP-B-12,962 describes a procedure of the type mentioned in the introduction. On the basis of the actual joint width scanned by a sensor, the number of weld beads to be deposited alongside each other is selected automatically, and the transition from one bead to the next is carried out in accordance with a specific procedure. However, during the welding, no account is taken of the variations in the cross-section of the joint, which cross-section is affected not only by the joint width, but also to a significant extent by the joint offset.

In another proposal, U.S. Pat. No. 4,608,481, the joint is filled by means of an oscillating movement of an electrode, and the shape of the joint is scanned at the same time by means of, for example, measuring the arc voltage during the oscillating movement at certain relative positions of the welding burner in relation to the workpiece. This procedure requires additional arrangements for the oscillating movement and separate control equipment for the movement.

OBJECT OF THE INVENTION

The aim of the present invention is to provide a multi-run welding method in which the actual joint cross-section at different portions of the joint is taken as the basis for the determination of the welding parameter or parameters affecting the amount of welding material to be deposited per unit of length.

SUMMARY OF THE INVENTION

The invention is characterized in that the sensor is oscillated in front of the weld head at the different portions of the joint and is made to measure coordinates, in two directions, of points on the contour of the joint in question, which points essentially define the cross-section of the joint. The two directions chosen are preferably the vertical direction and the lateral direction of the joint. The area of the polygon defined by the coordinates of these points measured during the same oscillating movement is calculated, and welding parameters are determined for the joint portions as a function of the corresponding polygon area. These welding parameters control the amount of welding material per unit of length to be deposited in a bead in the joint.

For practical reasons, the contour of the joint is scanned in a point-wise manner. The position of the points is defined by coordinates, preferably in the vertical and lateral directions of the joint. The points become corner points in a polygon, whose area can be easily calculated. In the case of simple joint shapes with pane joint surfaces, in general, only the coordinates of a small number of points are needed for calculating the polygon area corresponding to the joint cross-section. It is conceivable to measure these coordinates during a half oscillating movement of the sensor, for example by moving the sensor from one joint edge to the other, so that the sensor can scan the contour of the joint between the joint edges.

The sensor is advantageously moved in synchrony with the weld head, that is to say with the welding speed. During the oscillating movement of the sensor, the sensor is also moved along the joint, and the oscillating movement and the measurement proceed within a specific portion of the joint. On account of this movement, the various points on the joint contour measured in the same operation belong to different cross-sections of the joint. The surface of the calculated polygon therefore becomes a type of mean value for the varying cross-sectional area within the joint portion.

The length of the scanned joint portion is a function of the ratio between the speed of the oscillating movement and the welding speed. The greater the oscillating speed and the lower the welding speed, the smaller the length is of the scanned joint portion. The shorter the scanned joint portion is, the smaller the variations in the cross-sectional area are within the joint portion.

The measurement method described above for determining a cross-sectional area which is a mean value for a specific joint portion has been found to be completely sufficient for a satisfactory welding result in automatic multi-run welding.

Within the scope of this invention, it is also conceivable to have the sensor scan a cross-sectional area without the sensor being moved in synchrony with the weld head. This provides a correct value for the cross-sectional area at a specific point in the joint. However, the next measurement can only be carried out a distance further on in the joint, since account must be taken of the continuous movement of the weld head. The individual measurements of the joint cross-section must in this case be taken as a basis for a mean calculation of the cross-sectional area between the different measurement times, and the result is very similar to the result obtained with a sensor moved in synchrony with the weld head.

Calculation of the polygon area corresponding to the cross-sectional area also requires the coordinates of a point on each joint edge. Since a direct scanning of the position of the joint edges is difficult to carry out with the sensor, in a preferred embodiment of the invention the sensor is made to measure a coordinate in the vertical direction of a respective point on each topside of the joint. A line is then calculated between two points on each joint side and the point of intersection of the line with the plane defined by the topside of the joint is a point of the joint edge of the corresponding joint side.

According to a preferred embodiment of the invention, the sensor is oscillated during on-going deposition of a weld bead, in which respect at least the first bead is deposited with a certain amount of welding material per unit of length, which amount is preferably identical along the whole joint. It has been found to be advantageous to scan the whole joint before the welding parameters for the next bead are determined. However, the welding and scanning of the joint should take pace simultaneously in order to minimize the overall time for the welding work. In this regard, the sensor is arranged in front of the weld head and scans the contour of the joint while the first bead is being deposited. Therefore, no measurement values are obtained for determining the welding parameters for the first bead and the first bead is deposited with a predetermined amount of welding material per unit of length, which amount is preferably identical along the whole joint. It may be advantageous for practical reasons to initially deposit several beads with a certain predetermined amount of welding material.

According to the invention, it is also advantageous for the welding parameters for each joint portion to be a function of the residual area calculated for the joint portion, this residual area being the difference between the calculated polygon area and the corresponding cross-sectional area of the bead being deposited. Thus, when the welding parameters are determined, the area of the bead which is deposited by the weld head is calculated from the polygon area scanned by the sensor. In this case it is advantageous for only one welding parameter to be determined for each joint portion as a function of the polygon area, namely either the welding speed or the feed speed of the electrode, preferably the welding speed.

According to the invention, it is also advantageous for a welding speed for deposition of a certain amount of welding material to be determined corresponding to the mean value of the polygon areas of the joint portions. It is also advantageous for the welding speed for the various joint portions to be calculated as a function of the ratio between the polygon areas of the joint portion and the mean of the polygon areas. A value giving optimum or close to the optimum welding quality is selected as the mean value. The welding speed in the various joint portions is calculated with regard to the deviation of the joint portion from the mean value. In cases where there are considerable variations in the contour of the joint, these deviations are also quite considerable. It is therefore advantageous, according to the invention, for a warning signal to be triggered when the welding parameter for any joint portion has a value lying outside a predetermined value range. This value range should include a maximum and minimum value and also the mean value for the welding parameter. The warning signal informs the operator that, on account of the shape of the joint, the welding parameter at one or more joint portions has a value which indicates that the welding result can no longer be regarded as acceptable. The operator can intervene in the on-going welding work and correct this error in a number of conventional ways which are not covered here.

According to a further embodiment of the invention, the welding speed is a function of the residua area calculated for the joint portion and a function of the welding speeds which have been calculated for the two adjoining joint portions. Since only one polygon area is calculated for each joint portion, there is only a discrete sequence of values of calculated welding speeds. For the best weld, the transition between these welding speeds must be effected continuously. For the required change in speed, a suitable acceleration or deceleration is selected, in which respect account must be taken of the mass of the material whose speed is to be changed.

In automatic multi-run welding, the number of beads must be determined for each layer. According to one embodiment of the invention, a second bead is deposited in the joint alongside the first bead in order to form an intermediate layer. This intermediate layer is deposited when the mean of values corresponding to the width of the joint, in the various joint portions at the level of this intermediate layer, is greater than a predetermined value. Intermediate layer here refers to all weld layers in the joint with the exception of the root layer and the top layer.

it is also advantageous for the value corresponding to the width of the joint to be equal to a product $k.b_1$, in which k is a factor between 0.5 and 1.0, and $b_1$ is the joint width at the actual joint base. It is also advantageous that the given width value be a certain distance in the lateral direction of the joint between the electrode tip and the joint surface. The joint width is determined by the sensor at each joint portion by means of the measured coordinates. As has been described above, the measurement method employed provides a certain mean value of the width dimension for each joint portion; the width dimension being the joint width at the actual joint base. The introduction of only this mean value of the joint width within each joint portion does not in practice affect the desired result of obtaining an indication of when two beads need to be deposited in the joint. The factor k is dependent on the shape of the joint and on the welding parameters, and is determined by testing. The distance between the electrode tip and the joint surface is chosen with regard to the desired penetration zone in the base material.

The filling of the joint should also be uniform in the case of an edge offset. At the joint side with the higher joint edge, a greater amount of welding material must be deposited than at the other joint side. According to the invention, it is advantageous for the polygon defined by the coordinates of the measurement points to be divided by a center line through the joint into a first and a second subpolygon, which include the measurement points on each respective joint side and joint edge. It is also advantageous for the welding parameters for the weld bead, which is to be deposited against the respective joint side, to be determined for the joint portions as a function of the corresponding subpolygon area. The amount of welding material per unit of length for the two beads is thus adapted to the actual cross-sectional area of a joint with varying edge offset.

As has been described above, the deposition of two beads per layer is determined only as a function of the width of the joint at the level of the layer. In contrast, the deposition of three or more beads per layer is determined as a function of the cross-section of the layer.

According to the invention, it is advantageous for at least three beads to be deposited in an intermediate layer, when the mean of a value, determined for each joint portion, of the cross-sectional area of the said intermediate layer is greater than a predetermined value. It is also advantageous for the number of beads in the intermediate layer to be a function of the mean value, and for the cross-sectional area of the third bead, and where appropriate further beads, in this layer to be a function of the cross-sectional area of the first two beads in this layer which are deposited against the joint sides. The calculated value of the cross-sectional area of the intermediate layer in each joint portion is calculated as a function of the width of the intermediate layer and the mean value of a measured height $h_1$ of the bead deposited first in this intermediate layer against one of the joint sides at a certain distance from the joint side, and of a calculated height $h_2$ of the bead deposited immediately thereafter against the other joint side, where $h_2 = (h_1.a_2)/a_1$ and $a_1$ and $a_2$ are the cross-sectional areas of the two deposited beads.

For determining the number of beads, it is advantageous to start from a calculated value of the area of the intermediate layer. When al the beads have finally been deposited in this intermediate layer, its actual cross-sectional area generally differs somewhat from the calculated theoretical value.

For calculating the theoretical value, the height $h_1$ is determined by means of the sensor, whereas the height $h_2$ is calculated, since the sensor is not capable of measuring the height of the second bead before depositing the third bead, as is explained hereinafter. When calculating the cross-sectional area of the intermediate layer, the width dimension chosen is advantageously a dimension which represents a mean value of the joint width at this layer.

For practical reasons, the value of the area of the intermediate layer is also calculated before deposition of the 4th, 5th etc. bead in the intermediate layer in the same way as has been described above with a calculated value of $h_2$, despite the fact that the actual height dimension $h_2$ can be determined before the deposition of these beads.

In the case of an edge offset, in order to achieve an even distribution of the amount of welding material per unit of length in the three or more beads in the layer, the polygon defined by the coordinates of the measurement points is divided by a center line through the joint into a first and a second subpolygon, which include the measurement points of each respective joint side and joint edge. The welding parameter for the weld bead which is to be deposited against the one joint side or other joint side, respectively, is determined for each joint portion as a function of the corresponding subpolygon area, and of the cross-sectional area of the last-deposited bead in the underlying layer. The cross-sectional areas for the further beads in the same intermediate layer are obtained by interpolation with respect to the two beads already deposited against the joint sides, and the corresponding welding speeds are inversely proportional to the cross-sectional areas. In the case of an edge offset, the amount of welding material per unit of length in a joint portion is different in the two outermost beads deposited against the joint side. Therefore, in the intermediate beads, an amount of welding material will be deposited which is obtained by interpolation of the two amounts of welding material which have been deposited against the joint sides. The corresponding welding speed is inversely proportional to the value of the cross-sectional area corresponding to the amount of welding material. In this way, the distribution of the deposited welding material is uniform in the whole layer.

Before a subsequent layer is deposited, a check is always made to ascertain whether this subsequent layer will be a top layer with which the welding is finished. According to the invention it is therefore advantageous, after deposition of an intermediate layer in the joint and before deposition of the next layer, to calculate the quotient from the mean value of the polygon areas of the joint portions of the remaining joint cross-section and the mean value of the cross-sectional areas of the last-deposited intermediate layer in all joint portions. It is also advantageous for the beads for a top layer to be deposited in the joint on this intermediate layer when the quotient is less than a predetermined value, preferably less than 0.7, in which respect the number of beads in the top layer is preferably increased by one, compared to the number in the last-deposited intermediate layer. Thus, after finishing each layer, a comparison of the value of the above-mentioned quotient with a predetermined value is carried out to determine whether the next layer will be a top layer.

The invention will now be described in greater detail with reference to the attached drawings which shows an exemplary embodiment. Further advantages of the invention will emerge from this description.

One feature of the invention resides broadly in a method for automatic multi-run welding of a joint formed between at east two adjacent pieces to be welded by a weld head to form a weld, each of the at least two adjacent pieces comprising a joint surface, each joint surface being disposed for being welded to at least one adjacent joint surface, the method comprising the steps of: scanning at east one joint surface of the joint with sensor means, directly measuring by the scanning a plurality of actual points on the at least one joint surface, generating data corresponding to coordinates of the plurality of points, calculating with the data to obtain values to determine at east a part of a cross-section of at least a portion of the joint, and also calculating at least a part of a cross-sectional area of at least a part of the cross-section, and adjusting at east one of; a speed of feed of a solid welding material being fed into the weld, and a relative speed of movement between the weld head and the at east two adjacent pieces, by using the obtained values to control the amount of solid welding material deposited along the joint.

Another feature of the invention resides broadly in an apparatus for automatic multi-run welding of a joint formed between at least two adjacent pieces to be welded by a weld head to form a weld, each of the at least two adjacent pieces comprising a joint surface, each joint surface being disposed for being welded to at east one adjacent joint surface, the apparatus comprising: a welding housing, a weld head disposed on the welding housing, the weld head comprising a device for receiving a solid welding medium and a device for feeding the solid welding medium to the weld, a welding power supply for providing current for the weld head, a device for providing relative movement between the weld head and the at least two adjacent pieces, sensor for scanning at least a portion of the joint, the sensor being for directly measuring a plurality of actual points on at least one joint surface to generate data corresponding to coordinates of the points, processing device for receiving the data corresponding to coordinates of the points, for calculating the cross-sectional area of the joint from the data corresponding to coordinates of the points, for calculating at east one of; a speed of feed of the solid welding medium into the weld, and a relative speed of movement between the weld head and the at east two adjacent pieces, and for producing signals for control of the welding, at least one of; a device for controlling the device for feeding the solid welding material to control the amount of solid welding material being fed into the weld, and the device for controlling the device for providing relative movement between the weld head and the at east two pieces to control the amount of solid welding material being deposited along the joint, and a control device for receiving the signals for control of the welding, and for controlling at least one of the device for controlling the device for feeding the solid welding material to control the amount of solid welding material being fed into the weld, and the device for controlling the device for providing relative movement between the weld head and the at least two pieces to control the amount of solid welding material being deposited along the joint.

BRIEF DESCRIPTION OF THE DRAWINGS

FIGS. 1a, 1b and 1c show a section through a slightly deformed V-type joint at different times during welding.

FIGS. 2a, 2b and 2c show the edge offset in a butt joint in cylindrical workpieces.

FIGS. 3a and 3b show two types of square butt joints.

FIG. 4 is a section along IV—IV in FIG. 5.

DESCRIPTION OF THE PREFERRED EMBODIMENT

Figure 4:
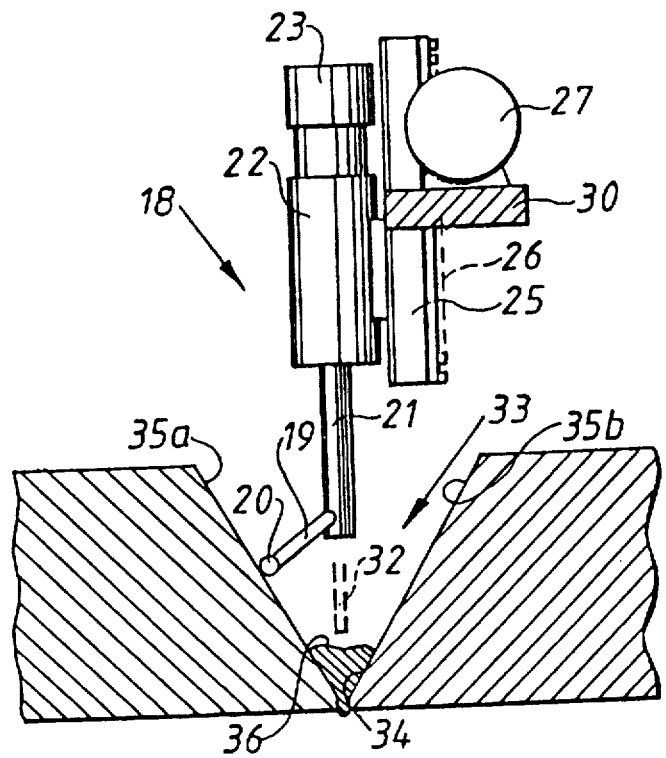
FIG. 4 shows, somewhat diagrammatically, a sensor for scanning a joint contour.

FIG. 1a shows a section through a V-type joint between two workpieces 1a, 1b with a gap, 2, joint sides 3a, 3b, joint edges 4a, 4b, root sides 5a, 5b and topsides 6a, 6b. The workpieces 1a and 1b are shown slightly offset in the vertical direction with respect to the joint edges 4a, 4b. The cross-sectional area $A_o$ of the joint is delimited by the joint sides 3a, 3b, the gap 2 and an imaginary line 7 between the two joint edges 4a, 4b.

FIG. 1b shows the same joint with a root bead 8. The cross-sectional area of the joint is now smaller and is designated by $A_1$. In some cases, the penetration of the bead into the base material on the root side of the joint is not satisfactory, and an additional root bead must be deposited. This additional root bead is usually deposited on the underside of the joint after the complete welding of the rest of the joint. In this respect, is usual to turn the workpieces over in order to facilitate the welding work. The question regarding the need for an additional root bead is not discussed here and does not constitute part of the invention. The root bead 8 is deposited along the whole joint with fixed welding parameters.

it should be noted that the cross-section of the joint varies along the joint on account of manufacturing tolerances, especially as regards the joint width, the edge offset and changes in shape during welding. When the first bead is deposited at a constant welding speed $v_s$ and a constant feed speed $v_e$ of the welding electrode, the cross-section $a_{sn}$ of the deposited bead is identical along the whole joint, namely $a_{sn}=(a_e v_e)v_s$, in which $a_e$ is the cross-sectional area of the welding electrode. After the first bead is deposited, the cross-sectional area $A_o$ of the joint at the position examined decreases to $A_1=A_o-a_{s1}$ or, in general terms, the cross- section at a position n of the joint becomes $A_{1n}=A_{on}-a_{s1n}$. As has already been stated, $A_{1n}$ varies along the whole joint. FIG. 1c shows the same joint after deposition of a further three beads 9, 10, 11. The remaining cross-sectional area becomes $A_4=A_o-(a_{s1}+a_{s2}+a_{s3}+a_{s4})$ in which $a_{s2}$ to $a_{s4}$ are the cross-sectional area of the second to fourth beads at the position examined. In general, $A_{xn}=A_{on}-(a_{s1n}+\ldots a_{sxn})$, that is to say the cross-sectional area $A_{xn}$ after bead x has been deposited at the position n of the joint is the difference between $A_{on}$ and the sum of the cross-section of all x beads at this position. The welding speed upon deposition of the following bead is a function of the residual cross-section which is to be filled with welding material. If the cross-section of a joint portion is less than a mean value, the welding speed in that joint portion should be greater than the welding portions which have wider cross-sections, and conversely. A uniform filling of the joint is obtained in this way. In practice, an exact determination of the joint cross-section is not possible. In addition, the specified values for the cross-sectional area of the bead are not completely reliable since the feed speed of the electrode is not constant. A summation of these cross-sectional areas can lead to an error accumulation.

An edge offset generally occurs on butt-joint welding of large pipes or cylindrical containers. The cross-sections of the pipe or container parts which are to be welded together always differ slightly from a circle shape and are elliptic or oval. When welding such workpieces together, it is not generally possible to bring the axis systems of the elliptic or oval cross-sections into coincidence with each other. The result of this is an edge offset in the joint, which changes continuously along the whole joint. FIG. 2a shows, sightly exaggerated in the axial direction, two cylindrical workpieces 12a, 12b with eliptic cross-section in the butt-joint position. The edge offset along the section I—I (FIG. 2b) of the two workpieces 12a, 12b is the opposite of that along the section II—II (FIG. 2c). As can be seen, the edge offset varies continuously around the periphery.

Figure 5:
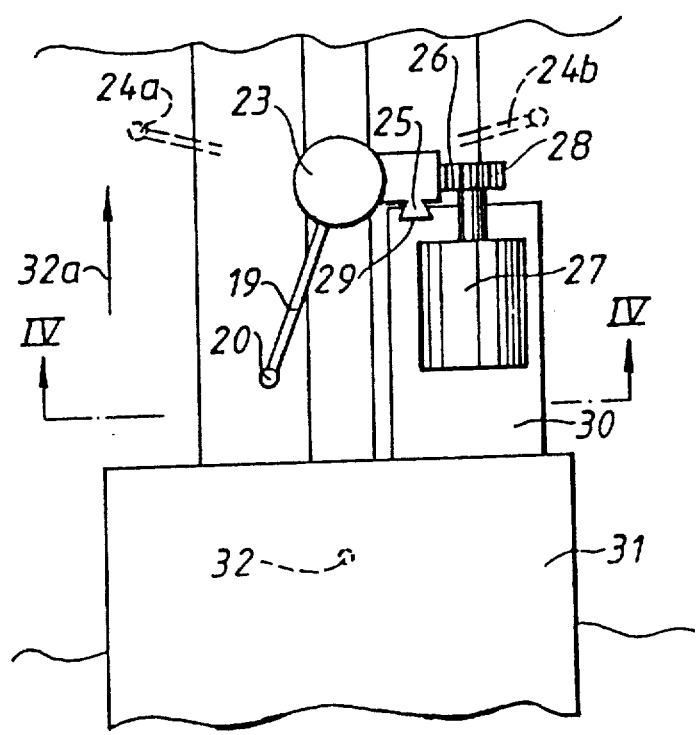
FIG. 5 shows an overhead view of the same sensor as shown in FIG. 4.

In most cases, only one root bead is applied in the joint base, filling the entire width of the joint. This is true in particular for V-type joints, U-type joints and other similar joints. In the case of narrow square-butt joints, which are used in narrow-gap welding, the square-butt joint is provided on the root side (FIG. 3a) for example with a lip 13 delimiting a narrow gap 14. In another embodiment, the joint is prepared as an open square-butt joint (FIG. 3b) with a backing strip 15 being welded against the underside of the joint to serve as a weld support. In these joints, two base beads 16 and 17 are applied alongside each other. These two base beads are welded at a predetermined welding speed, and a calculation of the welding speed on the basis of the calculated cross-sectional area in the joint portion is first started in conjunction with the deposition of the second bead, in which respect information for the deposition of the third bead is obtained.

it is advantageous to measure the contour of the joint using a sensor which, upon point contact with the joint contour, emits signals corresponding to the coordinates of these points in the vertical and lateral directions of the joint. The sensor 18 shown slightly diagrammatically in FIGS. 4 and 5 is provided with a feeler rod 19 with a ball-shaped tip 20. The feeler rod is fixed in a column 21 which is rotatable in a housing 22. The column is connected to a drive motor 23 and can be rotated slightly more than 180°, as is shown by the broken lines indicating the two end positions 24a, 24b of the rotational movement of rod 19. In another possible embodiment, the feeler rod is much longer and the rotational movement is limited to a smaller swing angle. A guide 25 with a rack 26 is secured to the housing 22, and a gear wheel 28, driven by a motor 27, is in engagement with the rack 26. The guide 25 is displaceable in the vertical direction in a guide groove 29 in a bracket 30, which supports the motor 27. The bracket is connected securely to a welding burner 31 (indicated here only diagrammatically) which is provided with a feed mechanism (not shown here) for a welding electrode 32, whose position has been indicated with broken lines. The direction of welding is shown by an arrow 32a. Several beads 34 have already been deposited in the joint 33, and an additional bead, which cannot be seen in FIG. 4, is being deposited using the electrode 32.

During welding, the sensor scans the contour of the joint, that is to say the sides 35a, 35b and the base 36 of the joint. For determining a specific point, the sensor 18 is lowered until the tip 20 makes contact with the base 36 of the joint, that is to say the topside of the deposited beads 36 or the joint sides 35a, 35b. The height coordinate of the point is scanned by means of the rotational position of the motor 27 which raises and lowers the feeler rod 19. The coordinate of the point in the lateral direction of the joint is obtained from the rotational position 19 of the feeler rod.

Figure 6:
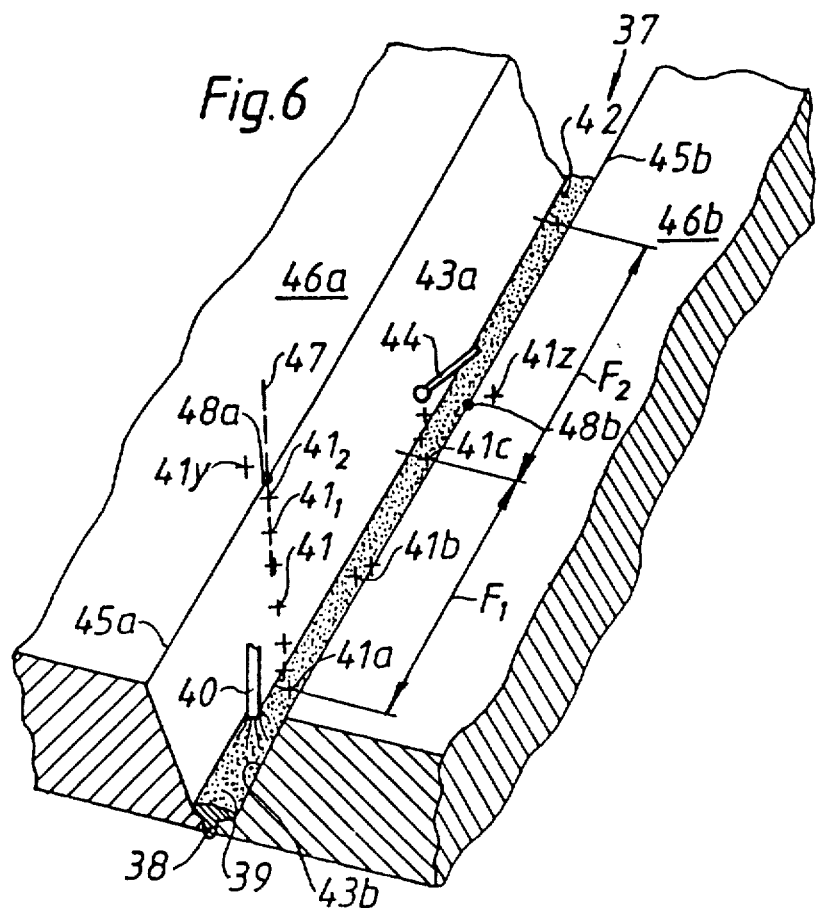
FIG. 6 is a perspective view of a U-type joint.

A U-type joint 37 shown in perspective in FIG. 6 is partially filled with a first bead 38. The deposition of a second bead 39 by means of an electrode 40 is in progress. A number of points 41 on the base 42 and on the sides 43a, 43b of the joint, whose positions are scanned by the sensor shown here by only its feeler rod 44, are marked by a +. The sensor starts an oscillating movement at the base 42 of the joint at a point 41a, is moved to the one joint side 43a and is moved upwards along side 43a and past the joint edge 45a. At each point, the movement of the sensor as described above is repeated for determination of the coordinates of the point. When the sensor has passed the joint edge 45a, the feeler rod upon its rotation in the lateral direction no longer makes contact with the workpiece, and no coordinate in the lateral direction can be determined. In contrast, a height coordinate is scanned for a point 41y on the topside 46a. As soon as this information is available, the sensor returns to a starting position 41b at the base 42 of the joint. From there, the same measurement procedure is repeated on the joint base 42 and the other joint side 43b (not shown here) including a point 41z on the topside 46b, after which the sensor is returned to a new starting position 41c. During the measurement, the sensor has been moved along the joint at a specific and, where appropriate, variable welding speed, so that the scanned points do not lie in one plane transverse to the longitudinal direction of the joint. Between the points 41a and 41c there extends a joint portion $F_1$ within which the sensor effected the oscillating movement described above.

For a determination of the cross-section of the joint to be as satisfactory as possible, the coordinates of at least one point on each joint edge are required. A scanning of the exact position of the joint edge by means of the sensor is difficult to carry out. It is considerably simpler to determine this point by means of calculating a line 47 through two points $41_1$, $41_2$ set by their coordinates in the vicinity of the joint edge 45a. The point of intersection between this line 47 and the plane which is represented by the topside 46a of the joint is a point 48 on the joint edge 45a. The calculation of the coordinates of this point is simple to carry out as the points $41_1$ and $41_2$ and the associated joint edge 45a must lie in one plane. A point 48b is obtained on the other joint edge 45b in the same way.

Figure 6A:
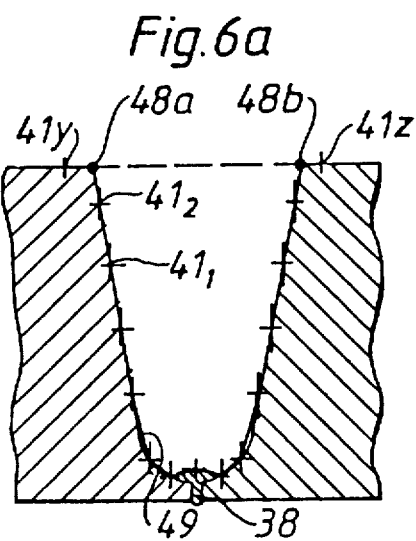
FIG. 6a shows cross-sectional view of the joint of FIG. 6.

The measured points include only the vertical and lateral coordinates. The scanned points can therefore be placed in a pane defined by the coordinate axes and become, in this plane, the corner points of a polygon 49 (FIG. 6a). FIG. 6a is thus a section through al the points 41 in the joint portion, in which respect the points have been projected onto the coordinate plane. The deviation of the polygon from the geometric shape of the joint, here the U-type joint, is generally quite small. By choosing a sufficiently large number of measurement points, the polygon 49 represents a mean value of the cross-sectional area of the joint for the whole of the joint portion scanned, which mean value is satisfactory for determining the welding parameters.

When the sensor has effected its oscillating movement transverse to the joint, the next oscillating movement is advantageously started within a joint portion $F_2$ from the finishing position 41c of the sensor. It is also possible for there to be pauses between the oscillating movements of the sensor, for example when scanning those joints which have only small variations in the joint cross-section between joint portions.

Figure 7A:
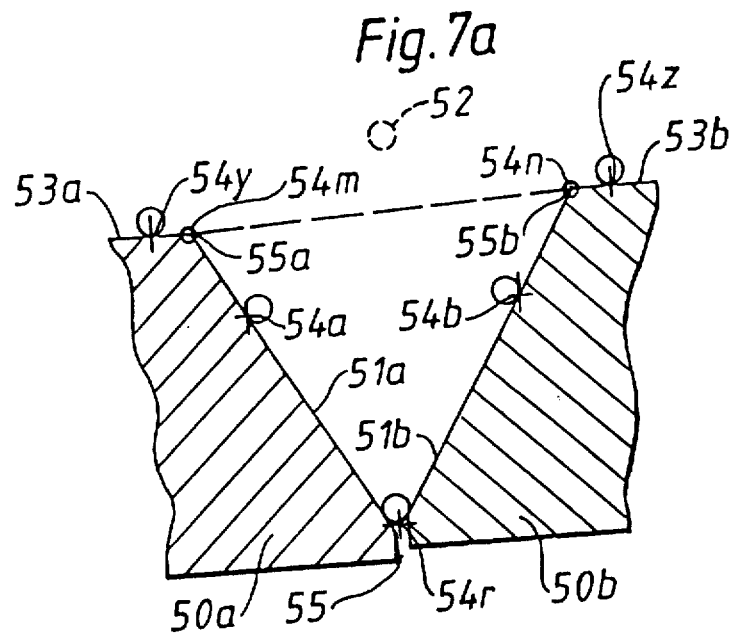
FIG. 7a shows a section through a V-type joint.

In joints with a simple geometric contour with planar joint sides, for example a V-type joint (FIG. 7a), only the scanning of a small number of points on the contour of the joint is required, since the deviations of the joint from the ideal shape generally relate only to the width of the joint and an edge offset.

The workpieces 50a, 50b are to a slight extent mutually offset in the vertical direction. The joint surfaces 51a, 51b are planar, and their contour can be determined simply by means of two points per joint side. Before welding is started, the sensor is swept over the joint in order to determine a starting position 52, approximately above the middle of the joint. From this starting position the sensor begins all the oscillating movements in conjunction with the joint scanning. It should be noted in this respect that the starting position is moved along the joint at the welding speed.

The sensor is moved from the starting position first to the one topside 53a and then to the other topside 53b, and the coordinates of the points 54y, 54z on the topsides are determined. The sensor is thereafter moved to the one joint side 51b, and a point 54b is scanned near the joint edge 55b, after which the sensor is moved to the root of the unfilled joint. Because of the ball-shaped tip of the sensor, it is only possible to obtain a measurement value of a point 54r in the vicinity of the root and the narrow gap 55 is not scanned at all. Therefore, when calculating the cross-sectional area of the joint, it is expedient to make an addition to the calculated area. The addition should correspond to the approximate value of the area which the sensor cannot scan. The coordinates of the remaining points can be determined with great accuracy, since it is possible to take account of the shape of the tip in the determination of the position of each of the remaining points. The sensor is then moved from the root upwards along the other joint side 51a, where a point 54a is measured, from there the sensor returns to its starting position 52 which, as mentioned above, has meanwhile been moved along the joint a certain distance depending on the welding speed.

The points 54m, 54n on the two joint edges are determined by calculating as described in conjunction with FIG. 6. The points 54m, 54n are, respectively, the points of intersection between the lines defined by the points (54a, 54r); (54b, 54r) and the plane defined by the topside.

Figure 7B:
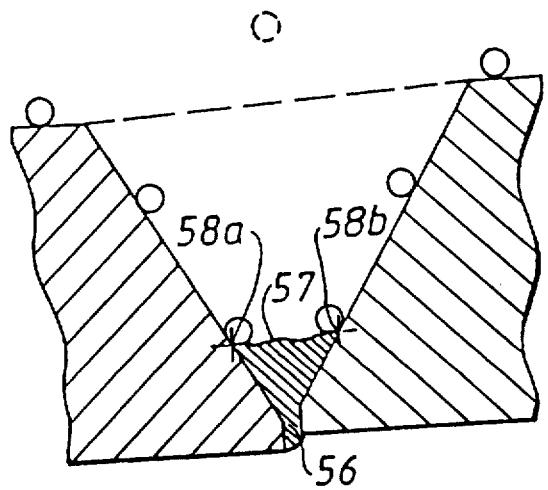
FIG. 7b shows the V-type joint of FIG. 7a with the first bead of a weld.

When the joint is filled with several beads (FIG. 7b), the joint contour is scanned in a similar manner as for the unfilled joint. The topside 57 of the welding material is scanned at least by means of two points 58a, 58b which indicate the position of the bead edge on the joint side. Since the topside 57 of the deposited welding material can be uneven, it may be expedient to scan several points on this topside.

Figure 8:
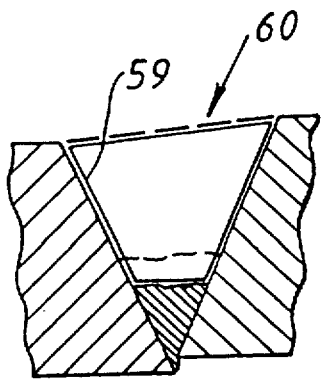
FIG. 8 shows a V-type joint for clarification of certain terms used in the description.

In FIG. 8, the enclosed area 59 of the joint 60 will generally represent a polygon area $P_{sn}$, where the first index refers to the cross-sectional area which is scanned in conjunction with the deposition of the s:th bead and n refers to the n:th joint portion, where the scanning was carried out. Thus, for example, $P_{13}$ refers to the mean value of the cross-section in the third joint portion, when the first bead is deposited. Since the scanning of the joint takes place before deposition of the bead, $P_{13}$ also refers to a polygon area without any bead in the joint.

The first bead is deposited at a constant welding speed and at a constant feed speed of the welding electrode. The cross-sectional area of the first bead is therefore identical in size in all joint portions and is here designated by $a_{1n}$, in which the first index refers to the number of the bead and the second index to the number of the joint portion. Therefore, as regards the first bead, the following generally applies:

$$a_{11}=a_{12}\ldots=a_{1n}$$

The corresponding cross-section residual areas for the determination of the welding parameter for the second bead are therefore:

$$R_{21}=P_{11}-a_{11}, R_{22}=P_{12}-a_{12}\ldots R_{2n}=P_{1n}31\ a_{1n}$$

in the different joint portions 1, 2 . . . n, where $P_{11}, P_{12} \ldots P_{1n}$ are measured polygon areas, $a_{11}, a_{12} \ldots a_{1n}$ are the cross-sectional areas of joint portions 1−n of the first bead deposited which, in accordance with the above, is calculated from the feed speed of the electrode, the cross-section of the electrode, and the welding speed.

From these residual areas, $R_{21}-R_{2n}$ thus calculated, a mean residual area value $R_{2m}$ is formed, for which there is determined a corresponding welding parameter which controls the amount of the deposited welding material per unit of length. Here, the welding speed is chosen as a variable welding parameter, while the feed speed of the electrode is kept constant during the whole welding procedure. A welding speed $V_{2m}$ corresponds to the mean value $R_{2m}$. Upon deposition of the second bead, the welding speed $V_{2n}$ in the respective joint portion n is calculated:

$$V_{2n}/V_{2m}=R_{2m}/R_{2n}$$

Figure 9:
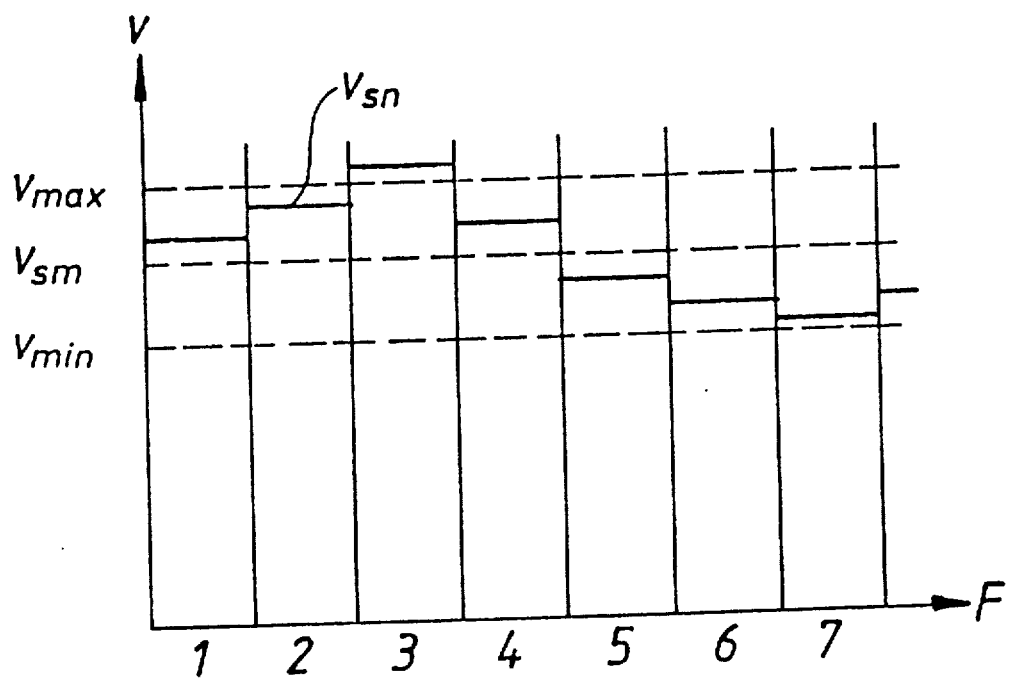
FIG. 9 shows a diagram of calculated welding speeds in different joint portions.

On the basis of the different values of $P_{sn}$, the welding speed is different from one joint portion to the next. In FIG. 9 the welding speed is shown as a function of the joint portions. The mean value of the speed $V_{sm}$ has been chosen with regard to the mean value $R_{sm}$ of the residual areas. For welding technology reasons, the variations in the welding speed should be kept within certain limits, which have been designated here by $V_{max}$ and $V_{min}$. The calculation is effected such that a mean value for the welding speed is chosen so that if possible the welding speeds for all joint portions, as calculated according to the above formula, lie within the range defined by $V_{max}$ and $V_{min}$. However, as shown in FIG. 6 for example, the speed in a joint portion sometimes exceeds the maximum o falls below the minimum values for the speed. The speed in joint portion 3 has a value which is greater than $V_{max}$. In such cases, a signal is triggered which, for example, informs the operator before the bead is deposited, that the welding speed at one or more joint portions will be too fast or too slow. A number of measures can be taken in order to rectify this problem. For example, one measure which can be taken is to limit the welding speed in these joint portions to the permissible upper or lower limit value, since it can be expected that there will be a compensation upon deposition of the subsequent bead. However, large differences indicate a considerable error upon joint preparation which may not be correctable with subsequent beads. In these cases, a correction is made by means of a manual welding operation in the joint portion concerned, in which respect the automatic welding operation must be interrupted and started up again after this joint correction.

On the basis of the speed calculated for these joint portions, the change from one to the other joint portion should be effected in skips, as shown in FIG. 9. However, in practice, the speed is controlled in such a way that there is a gradual, undisturbed transition from one speed to the next, in which respect it is desired that the mean value of the speed in each joint portion should be equal to $V_{sn}$. The difference between the calculated speeds of two adjoining joint portions is generally small, and a transition between the speeds, adapted to this difference, is also selected with regard to the masses which must be accelerated or decelerated.

It should be noted that the length of the joint portions is generally not equal. Since the sensor is moved along the joint at a variable welding speed, the distance along the joint, along which the sensor effects one cycle of its oscillating movement, is also of unequal length.

In the case of weld joints in which the weld width increases from the root to the topside, the number of beads per layer must be increased the closer one comes to the topside. In the V-type joint (FIG. 10), deposited beads 61, 62 are shown in the first and second layers. At the third layer the joint width is so great that two beads must be deposited in order to fill the whole layer.

The distance of the tip 63 of the electrode from one of the joint sides will be a predetermined value S, when the bead 64 adjoining the joint side is deposited. If the distance is greater than the predetermined value, the penetration of the bead into the base material is poor.

When the third bead 64 is deposited against the one joint side with the electrode at a distance S from the joint side, the polygon area $P_{3n}$ is measured simultaneously. This gives a value for a width b between the bead edges 65, 66 of the underlying bead 62. It has been found that only one bead per layer is required when $k.b_1 < S$, in which $b_1$ is the above-mentioned joint width at the joint base in question, that is to say the topside of the bead 62 before a new layer is deposited, and k is a factor between 0.5 and 1.0. Lower values for k are chosen in the case of joints where the joint angle in the layer in question is small, for example square-butt joints. In addition, the choice of the value of k is determined by one or more of the welding parameters, namely welding voltage, welding current, welding speed and electrode speed. The value of k is determined by testing with smaller values for k giving greater penetration into the joint side, and vice versa.

Before the bead 64 is deposited, the points of the joint contour scanned by the sensor upon deposition of the bead 62 are taken as a basis for calculating the polygon areas $P_{21}-P_{2n}$ and the corresponding residual areas $R_{31}-R_{3n}$ are calculated according to $R_{3n}=P_{2n}-a_{2n}$, in which $a_{2n}$ is the cross-section of the bead at joint portion n. The polygon areas $P_{21}-P_{2n}$ represent the area 67 framed by broken lines.

From the calculated residual areas for each joint portion, a mean value $R_{3m}$ is calculated, for which a mean speed $V_{3m}$ is chosen. These two values will be valid for both beads 64, 68 in this layer. These mean values are therefore designated $\underline{R}_{pm}$ and $\underline{V}_{pm}$, in which the index p designates the number of the layer, here the third layer. Before the bead 64 is deposited, it is not possible to establish whether an additional bead will be deposited in this layer. It is therefore advantageous for the calculation of the welding speed for all beads in the same layer to start from a common mean value for the layer, namely $\underline{R}_{pm}$ an $\underline{V}_{pm}$. The welding speed for the beads in the layer is therefore:

$$V_{pn} = (\underline{V}_{pm} \cdot \underline{R}_{pm})/R_{pn},$$

that is to say the welding speed in each joint portion is identical for both beads. The value of $\underline{V}_{pm}$ is chosen again with regard to the spread of the different values $V_{pn}$ in the different joint portions, so that if possible no value of $V_{pn}$ lies outside the range defined by $V_{max}$ and $V_{min}$. Otherwise, a warning signal is triggered.

In the case of joints with an edge offset, the above-mentioned calculation leads to unfavorable results, and the calculation of the welding speed must therefore be supplemented with a factor which takes account of the distribution of the welding material in the bead. In order to obtain a uniform distribution of the welding material in such a joint (FIG. 11), for each joint portion a polygon area is calculated for the left-hand and right-hand joint half. A center line 69, which divides the polygon area into two subpolygons, is drawn from the center point of the connection line between the joint edges to the joint center at the root. The extent of this line is calculated with the aid of the coordinates scanned by the sensor.

The subpolygon $D_{2n1}$ and $D_{2n2}$ where $D_{2n1}+D_{2n2}=P_{2n}$, enclose the areas 70, 71 framed by the broken lines. The sub-polygons are calculated when a new layer, here the third one, is to be deposited. The area of the subpolygons is reduced by an amount equal to half the cross-sectional area $a_{2n}/2$ of the last deposited second bead 74, so that two partial residual areas are obtained:

$$R_{3n1} = D_{2n1} - a_{2n}/2 \text{ and } R_{3n2} = D_{2n2} - a_{2n}/2$$

The two subpolygons form the basis for the calculation of the welding speed in the joint portion n in the third layer of the joint, which comprises the two weld beads 72, 73.

Figure 11:
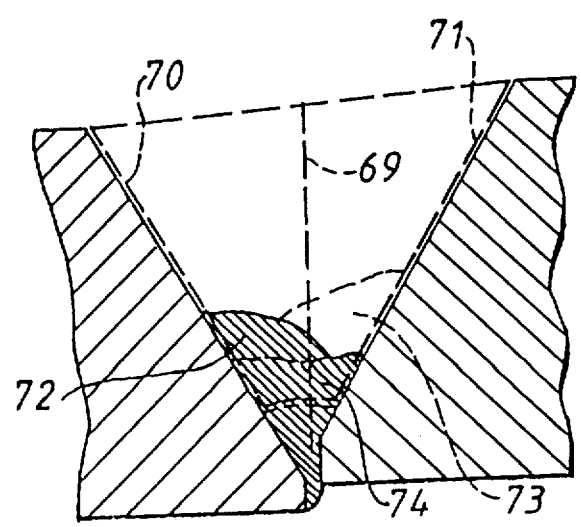
FIG. 11 shows a V-type joint with an edge offset, in the case of deposition of a layer with two beads.

The calculation of the welding speed for the two beads which are deposited against the joint sides starts from the above-mentioned calculation $\underline{R}_{pm}$ and a related welding speed $\underline{V}_{pm}$ for the two beads in the layer. With regard to the edge offset which is expressed by the disparity $\underline{R}_{pn1}=\underline{R}_{pn2}$, the welding speeds for the two beads are now calculated in general by:

$$V_{pn1} = (\underline{V}_{pm} \cdot \underline{R}_{pm})/2 \cdot R_{pn1}, V_{pn2} = (\underline{V}_{pm} \cdot \underline{R}_{pm})/2 \cdot R_{pn2},$$

or according to FIG. 11:

$$V_{3n1} = (\underline{V}_{3m} \cdot \underline{R}_{3m})/2 \cdot R_{3n1}, V_{3n2} = (\underline{V}_{3m} \cdot \underline{R}_{3m})/2 \cdot R_{3n2}.$$

It should be noted that the first index after underlined designations R and V refer to the number p of the layer, and after non-underlined references to the number s of the bead.

Figure 12:
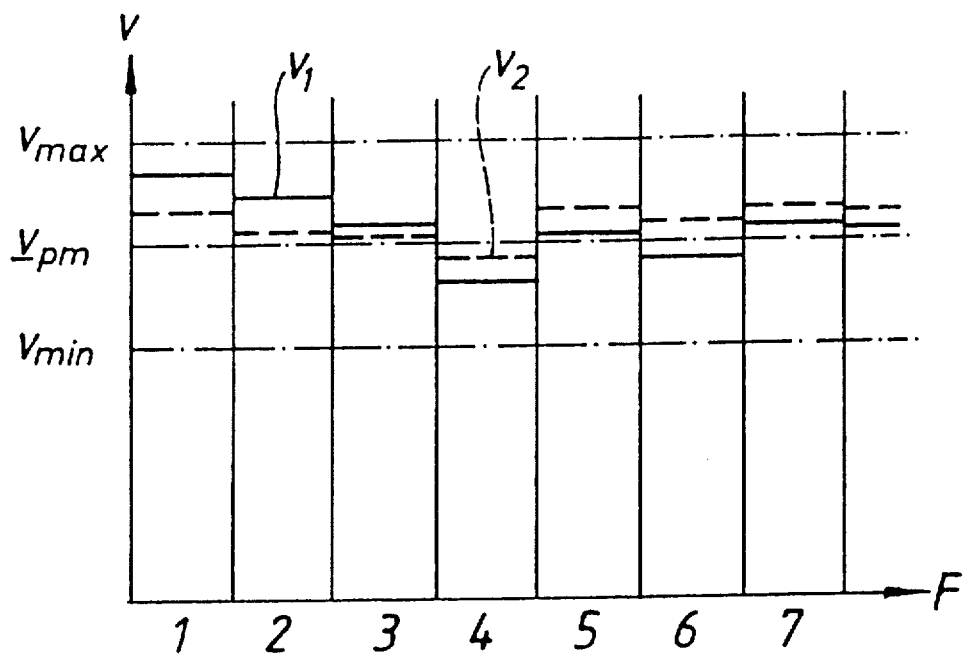
FIG. 12 shows a diagram of calculated welding speeds for two beads which are to be deposited in the same layer of a V-type joint with an edge offset.

The diagram of FIG. 12 shows an example of a relationship between calculated welding speeds for two beads in a layer at different joint portions F as well as the mean value $\underline{V}_{pm}$ of the welding speed and the permitted limit values $V_{max}$ and $V_{min}$. The calculated welding speeds in each joint portion are shown on the one hand by full lines $V_1$ for the one bead and by broken lines $V_2$ for the second bead. The bead which is deposited at a lower speed has a greater cross-section and is therefore applied against the joint side whose joint edge is situated higher. In joint portions 1 to 3, $V_1 > V_2$, and from joint portion 4 onwards $V_2 > V_1$, which indicated that the edge offset from the joint portion 4 onwards is the opposite. It should be noted that the speeds shown here are calculated values. The transition between the calculated speeds of the joint portions is in practice effected continuously, and likewise, the necessary change in speed is chosen with regard to the masses of the welding apparatus and/or workpieces which must be accelerated or decelerated.

As a result of the above determination of the welding speed for the two beads, the joint is filled uniformly despite the existing edge offset.

Figure 13:
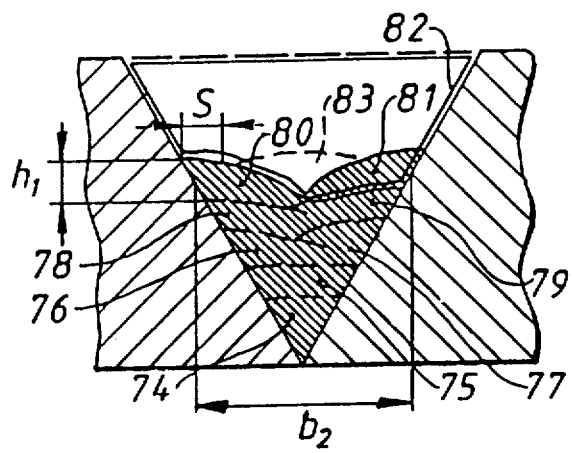
FIG. 13 shows a correct V-type joint in the case of deposition of a layer with three beads.

In a joint as shown in FIG. 13, one bead 74 in the first layer, one bead 75 in the second layer, two beads 76, 77 in the third layer and two beads 78, 79 in the fourth layer have been deposited. Two beads 80, 81 have already been deposited in the fifth layer. The cross-sectional area of the fifth layer is calculated as $b_2.h$, in which b is a mean value of the width of the joint at the level of the beads 80, 81 and $h=(h_1 h_2)/2$. The width of the topside of the layer formed by the beads 78, 79 has been measured by the sensor. The incline of the joint side within the layer which is to be deposited is also known. A mean value of the joint width in each joint portion can therefore be calculated. When the bead 81 is deposited, the polygon area $P_{8n}$, which is shown as enclosed area 82, is scanned. The height $h_1$ of the bead 80 is determined with the aid of the coordinates which applied for the determination of the polygon area $P_{8n}$ and $P_{7n}$. $P_{7n}$ is the polygon area which was scanned at the same time as the deposition of bead 80. The height $h_1$ is determined from these polygon areas at a certain distance from the joint side. The distance is advantageously equal to the distance S, which is the stated distance of the tip of the electrode in the lateral direction from the joint side upon deposition of a bead adjoining the joint side. A height $h_2$ of the bead 82 deposited against the other joint side cannot be determined in the same way, when only three beads are to be deposited in the layer. Determination of $h_2$ requires information on the polygon area $P_{9n}$, which is not available. It has been found that a calculation of the height $h_2$ according to the formula $h_2 = h_1 \cdot a_{8n}/a_{7n}$ gives a satisfactory result for the calculation of the degree of filling. $a_{7n}$ and $a_{8n}$ are the known cross-sectional areas of the beads 80 and 81 which have been deposited at a certain speed.

In FIG. 13 the ratios are such that the number of beads in the layer is three. The number of beads in the layer (Z) is advantageously calculated as follows:

$$Z = 2.b_2 h/(a_{7n} + a_{8n})$$

In FIG. 13 this value lies between 2.5 and 3.5. The value is rounded off in a known manner to 3. it may be advantageous to select the number of beads on the basis of a rounding-off calculation other than the normal one i.e., $Z = H + d$, in which H is the integer portion and d the decimal portion. It may be advantageous to choose $(H+1)$ beads already when $d > 0.35$ and not only when $d > 0.5$.

The cross-sectional area of the third bead 83 indicated here in the layer or the in-total ninth bead in the joint is $a_{9n}$. Advantageously $a_{9n} = (a_{7n} + a_{8n})/2$. The corresponding welding speed is proportional to the reciprocal value of $a_{9n}$.

At the transition from one layer with three or more beads to a layer with an additional bead, it is possible to determine the height $h_2$ of the bead deposited against the other joint side from the data on the contour of the joint. This data includes values for the bead deposited against the other joint side which is obtained in conjunction with the deposition of the third bead in the same layer. However, for practical reasons, the same calculation method is used as in the deposition of the third bead, that is to say the height $h_2$ is determined according to the formula given above.

Figure 14:
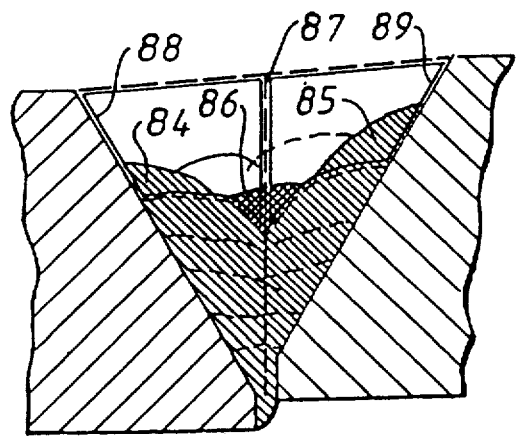
FIG. 14 shows a V-type joint with an edge offset, in the case of deposition of a layer with three beads.

In the case of a joint with an edge offset (FIG. 14) and several beads per layer, the welding speed is determined for the two beads 84, 85 adjoining the joint side in a new layer as a function of each subpolygon area, which is derived from the polygon area which was calculated in conjunction with the deposition of the last bead 86 in the last layer. The polygon area is divided by the center line 87 into two halves which in FIG. 14 have an area enclosed by a line 88, 89.

If the number of beads in the last layer is an odd number, in this case three, each subpolygon area is reduced by an amount equal to half the cross-sectional area of the last-deposited bead 86, which in such a case is always applied in the joint center, and the speed for the beads 84, 85 is inversely proportional to these residual areas.

If the number of beads in the last layer is an even number, the polygon area within which the main part of the last bead lies is reduced by the whole of the cross-sectional area of this bead in order to obtain a residual area, while the other subpolygon area is not reduced at all.

if the number of beads is even, the last bead lies to a very large extent or completely within a single subpolygon area. The residual areas corresponding to the welding speed of the two outermost beads in the new layer are made up in one case of the whole subpolygon area and in another case by the subpolygon area which has been reduced by the cross-sectional area of the cross-section of the last bead falling within the subpolygon.

The two possibilities for calculating the partial residua areas $\underline{R}_{pn1}$ and $\underline{R}_{pn2}$ for determination of the welding speed are thus as follows:

A) An odd number of beads has been deposited in the last layer $$P_{sn} = P_{sn1} + P_{sn2}, R_{pn} = P_{sn} - a_{sn}$$
$$R_{pn1} = P_{sn1} - a_{sn}/2, R_{pn2} = P_{sn2} - a_{sn}/2$$

in which s is the number of the last bead and p is the number of the new layer.

B) An even number of beads has been deposited in the last layer and the last bead has, for example, been deposited within the outer subpolygon area $$P_{sn} = P_{sn1} + P_{sn2}, R_{pn} = P_{sn} - a_{sn}$$
$$R_{pn1} = P_{sn1}, R_{pn2} = P_{sn2} - a_{sn}.$$

All these values of the areas according to A) and B) are present before the deposition of the first bead in the new layer. Before the deposition of the first bead in the new layer, a mean value $\underline{R}_{pm}$ of all the residual areas $\underline{R}_{pn}$ of the joint portions is calculated, and a certain welding speed is related to $\underline{R}_{pm}$, in which respect account is taken of the range within which the welding speed of all joint portions between $V_{max}$ and $V_{min}$ is to be situated.

The welding speeds for the two outermost beads in the new layer are then:

$$V_{pn1} = (V_{pm} \cdot R_{pm})/2R_{pn1}, \ V_{pn2} = (V_{pm} \cdot R_{pm})/2 \cdot R_{pn2}$$

The cross-sectional areas corresponding to $\underline{V}_{pn1}$ and $\underline{V}_{pn2}$ are $a_1$ and $a_2$.

For the beads which are to be deposited between the outer beads, the cross-sectional areas are calculated by linear interpolation, and corresponding welding speeds are inversely proportional to these cross-sectional areas.

Figure 10:
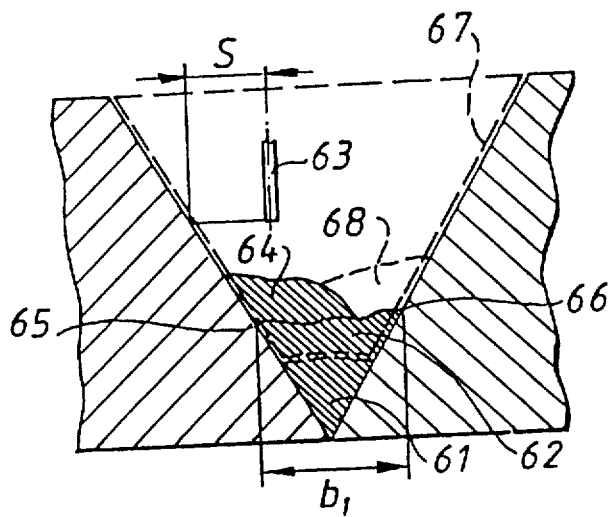
FIG. 10 shows a correct V-type joint in the case of deposition of a layer with two beads.
Figure 15:
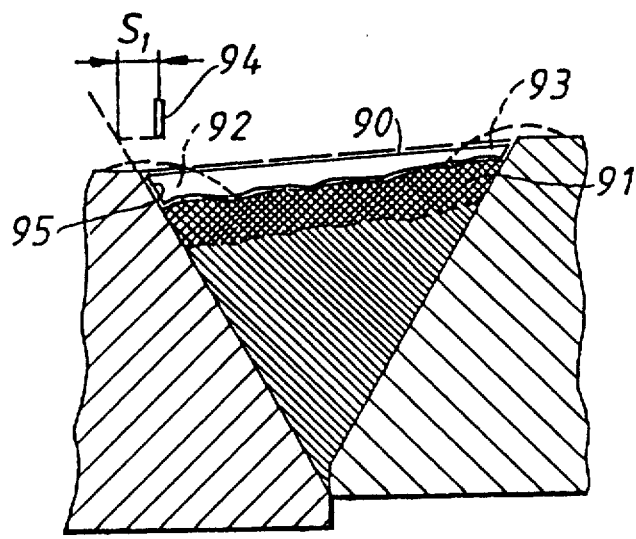
FIG. 15 shows a V-type joint before deposition of a top layer.

When the welding of a layer has been finished, a check is made to ascertain whether the next layer is to be a top layer which finishes the welding operation. The mean value $R_{pm}$ of the residual areas $R_{pn}$ of the joint portions, which is shown by the enclosed area 90 in FIG. 15, is calculated, after which a quotient is calculated from this mean value $R_{pm}$ and the mean value of the cross-sectional areas of the last-deposited intermediate layer in all joint portions. Such a cross-sectional area is shown by the crossed area 91 in FIG. 15. When this quotient is less than 0.7, the next layer is the top layer. Since the top layer will also cover the joint edges, the number of beads is preferably increased by one compared to the underlying intermediate layer. Upon deposition of the two outer beads 92, 93, the electrode tip 94 is held at a distance $S_1$ in the lateral direction from the joint surface 95 or its imagined extension above the topside, which distance is less than the above-mentioned distance $S$, that is to say $S_1 < S$ (FIG. 10). The distance $S$ depends on the joint shape and is determined by testing.

Figure 16:
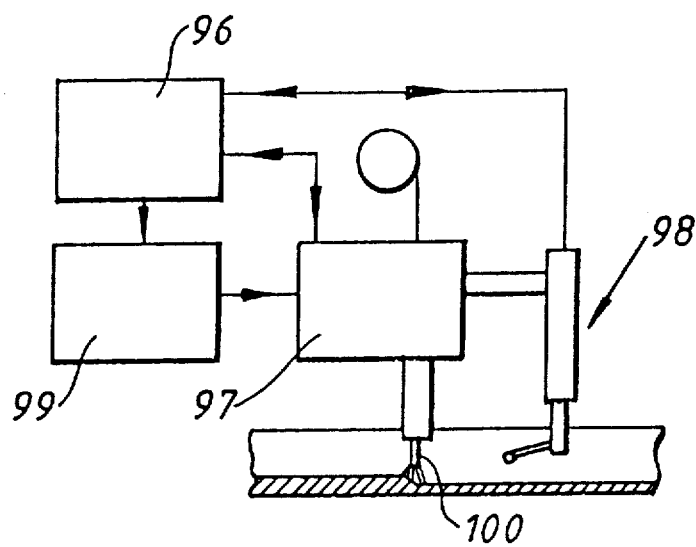
FIG. 16 shows diagrammatically an arrangement for automatic multi-run welding.

All the above-mentioned calculations are carried out in a microprocessor 96 (FIG. 16) which constitutes part of the welding equipment. The sensor 96 connected securely to a welding burner 97 emits signals corresponding to the scanned point coordinates. The microprocessor 96 receives the signals, and on the basis of the information received, calculates, according to a program, the values for the welding speed in each joint portion, the number of beads per layer, etc. The results are converted to signals which are transmitted to the supply unit 99 of the welding burner and to the welding burner 97 which is provided with a feed mechanism (not shown here) for the welding electrode 100. Moreover, the position of the sensor and of the welding burner in relation to the joint is checked continuously, for example, for determining the position of the joint portions as the scanning of the coordinates for calculation of the polygon areas progresses.

According to the above, the sensor carries out a comprehensive measurement program for determining the contour of the joint in each joint portion. These measurement values are also used for guiding the welding burner along the joint.

In summary, one feature of the invention resides in a method for automatic multi-run welding of a joint 33; 37 formed by two joint surfaces, in which method the contour of the joint is scanned by a sensor 18; 44 which emits signals corresponding to the contour of the joint, which signals, after evaluation, control the deposition of the weld beads by mean of a continuously fed electrode 32; 40 which is movable in at least three directions, and which is directed towards a welding point in the joint by an arc weld head 31 and is moved relatively along the joint, characterized in that the sensor is oscillated in front of the weld head transverse to the joint at different portions $F_1$, $F_2$ of the joint and is made to measure coordinates in two directions, preferably in the vertical direction and lateral direction of the joint, of points 41 on the contour of the joint in question, which points essentially define the cross-section of the joint, in that the area of the polygon defined by the coordinates of these points measured during one oscillating movement is calculated, and welding parameters, which will control the amount of welding material per unit of length in a bead to be deposited in the joint, are determined for the joint portions as a function of the corresponding polygon area.

Another feature of the invention resides broadly in a method which is characterized in that the sensor is made to measure a coordinate in the vertical direction of a respective point $41y$; $41z$ on each topside $46a$; $46b$ of the joint, and a line 47 is calculated between two measurement points $41_1$, $41_2$ on each joint side $43a$, in which respect the point of intersection of the line with the pane defined by the topside of the joint is a point $48a$; $48b$ of the joint edge $45a$; $45b$ of the corresponding joint side or a point of the polygon.

Yet another feature of the invention resides broadly in a method which is characterized in that the sensor is oscillated during on-going deposition of a weld bead, in which respect at least the first bead in the joint is deposited with a certain amount of welding material per unit of length, which amount is preferably identical for each joint portion.

A further feature of the invention resides broadly in a method which is characterized in that the welding parameters for each joint portion are a function of the residual area calculated for the joint portion, this residual area being the difference between the calculated polygon area and the corresponding cross-sectional area of the bead, whose deposition is in progress.

A yet further feature of the invention resides broadly in a method which is characterized in that only one, and the same welding parameter is determined for each joint portion as a function of the polygon area, in which respect the welding parameter is either the welding speed or the feed speed of the electrode.

Yet another further feature of the invention resides broadly in a method which is characterized in that the welding parameter is the welding speed.

An additional feature of the invention resides broadly in a method which is characterized in that a speed, corresponding to the mean value of the polygon areas of the joint portions, for deposition of a certain amount of welding material per unit of length is determined, and in that the welding speed for the different joint portions is calculated as a function of the ratio between the polygon areas of the joint portions and the mean value of the polygon area.

A yet additional feature of the invention resides broadly in a method which is characterized in that a warning signal is triggered when the welding speed for any joint portion has a value lying outside a predetermined value range comprising a maximum and minimum value.

A further additional feature of the invention resides broadly in a method which is characterized in that the welding speed is a function of the residual area calculated for the joint portion and a function of the welding speeds which have been calculated for the two adjoining joint portions.

A yet further additional feature of the invention resides broadly in a method which is characterized in that a second weld bead 68 is deposited in the joint alongside the first bead 64 in order to form an intermediate layer, when the mean value of the values corresponding to the width of the joint in the various joint portions at the level of the said intermediate layer is greater than a predetermined value.

Another further additional feature of the invention resides broadly in a method which is characterized in that the value corresponding to the width of the joint is equal to $k.b_1$, in which k is a factor between 0.5 and 1.0 and $b_1$ is the joint width at the bottom of the joint in question, and in that the predetermined value is a specific distance in the lateral direction of the joint between the electrode tip 63 and the joint surface.

A yet another additional feature of the invention resides broadly in a method which is characterized in that the polygon defined by the coordinates of the measurement points is divided by a center line 69 through the joint into a first and a second subpolygon 70, 71 comprising the measurement points on each respective joint side and joint edge, and in that the welding parameters for the weld bead to be deposited against the respective joint side are determined for the joint portions as a function of the corresponding subpolygon area and of the cross-sectional area of the last-deposited bead 74 in the underlying layer.

Another yet further feature of the invention resides broadly in a method which is characterized in that at least three beads are deposited in an intermediate layer, when the means of a value determined for each joint portion of the cross-sectional area of the intermediate layer is greater than a predetermined value, in that the number of beads in the intermediate layer is a function of the mean value, and in that the cross-sectional area of the third bead and where appropriate further bead in this layer is a function of the cross-sectional area of the first two beads 80, 81 in this layer which are deposited against the joint sides.

A still further feature of the invention resides broadly in a method which is characterized in that the determined value of the cross-sectional area of the intermediate layer in each joint portion is calculated as a function of the width $b_2$ of the intermediate layer and the mean value of a measured height $h_1$ of the bead 80 deposited first in this layer and against the one joint side at a specific distance S from the joint side, and of a calculated height $h_2$ of the bead 81 deposited immediately thereafter against the other joint side, in which respect $h_2 = (h_1.a_2)/a_1$, in which $a_1$ and $a_2$ are the corresponding cross-sectional areas of the two deposited beads.

Still another further feature of the invention resides broadly in a method in which the cross-sectional area of the intermediate layer is $b_2.h$, in which respect $b_2$ is the width of the said intermediate layer and $h = (h_1 h_2)/2$, and in that the number of beads per layer Z is calculated as follows:

$$Z = 2.b_2 h/(a_1 + a_2)$$

in which respect Z is rounded off to the nearest whole number.

Another still further additional feature of the invention resides broadly in a method which is characterized in that the polygon defined by the coordinates of the measurement points is divided by a center line 86 through the joint into a first and second subpolygon 87, 88 comprising the measurement points of each respective joint side and joint edge, and in that the welding speed for the weld bead 83, 84 to be deposited against the one joint side or the other is determined for each joint portion as a function of the corresponding subpolygon area 87, 88 and of the cross-sectional area of the last-deposited bead 85 in the underlying layer, in which respect the cross-sectional areas of the further beads in the same intermediate layer are obtained by interpolation with regard to the cross-sectional areas of the two beads deposited against the joint sides, and the corresponding welding speeds are inversely proportional to the cross-sectional areas.

Yet another still further additional feature of the invention resides broadly in a method which is characterized in that, upon deposition of two or more beads per layer, before deposition of the first bead in a new layer a mean value $\underline{R}_{pm}$ of the residual areas $R_{pn}$ of the joint portions is calculated and a specific welding speed $\underline{V}_{pm}$, which corresponds to the cross-sectional area $a_{pm}$ of th welding material, is related to the residual area $\underline{R}_{pm}$, and the welding speed $\underline{V}_{pn}$ which corresponds to a cross-sectional area $a_{pn1}$ for the bead against the one joint side and $\underline{V}_{pn}$ which corresponds to a cross-sectional area $a_{pn2}$ for the bead against the other joint side, which welding speeds are determined as functions of the corresponding residual areas which are a function of the subpolygon areas and the cross-sectional area of the last-deposited bead in the underlying layer $\underline{R}_{pn1}$ or $\underline{R}_{pn2}$, respectively as follows:

$$V_{pn1} = (V_{pm} \cdot R_{pm})/2 \cdot R_{pn1} \text{ and } V_{pn2} = (V_{pm} \cdot R_{pm})/2 \cdot R_{pn2},$$

in which respect the cross-sectional areas for the welding material for the intermediate beads are obtained by interpolation, and the corresponding welding speeds are inversely proportional to these cross-sectional areas.

Still another yet further additional feature of the invention resides broadly in a method which is characterized in that, after deposition of an intermediate layer in the joint and before deposition of the next layer, a quotient is calculated from the mean value of the residual areas of the joint portions of the remaining joint cross-section 89 and the mean value of the cross-sectional areas 90 of the last-deposited intermediate layer in all joint portions, and in that top beads for a top layer are deposited in the joint on this intermediate layer, when the quotient is less than a predetermined value, preferably less than 0.7, in which respect the number of beads in the top layer is preferably increased by one compared to the number in the last deposited intermediate layer.

Art hereby incorporated as reference includes U.S. Pat. Nos. 4,302,655 to Edling; 4,394,559 to Nomura et al.; 4,477,713 to Cook et al.; and 4,491,718 also to Cook et al.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicants' option, into the claims during prosecution as further limitations in the claims to patentably distinguish any amended claims from any applied prior art.

The invention as described hereinabove in the context of the preferred embodiments is not to be taken as limited to all of the provided derails thereof, since modifications and variations thereof may be made without departing from the spirit and scope of the invention.

What is claimed is:

1. A method for automatic multi-run welding of a joint formed between at least two adjacent pieces to be welded by a weld head to form a weld, each of the at least two adjacent pieces comprising a joint surface, each joint surface being disposed for being welded to at least one adjacent joint surface, said method comprising the steps of:

scanning each of the adjacent joint surfaces of the joint with sensor means, said scanning comprising scanning the joint in a plurality of scans of said sensor means along the joint, said scanning for sensing each said adjacent joint surface at a plurality of points on each said adjacent joint surface during each scan of said plurality of scans, each scan comprising a non-oscillating scan of each joint surface;

generating data corresponding to coordinates of said plurality of points from each scan;

calculating with said data to obtain values indicative of at least a part of a cross-section of at least a portion of the joint for each scan of said sensor means along the joint;

calculating at least a part of a cross-sectional area of said at least a part of a cross-section;

adjusting at least one of:
a speed of feed of a solid welding material being fed into the weld, and
a relative speed of movement between the weld head and the at least two adjacent pieces, by using said obtained values indicative of said at least a part of a cross-section to control the amount of solid welding material deposited along said at least a portion of the joint; and depositing at least two beads of solid welding material along said at least a portion of the joint during at least two runs of said weld head along the joint.

2. The method for automatic multi-fun welding of a joint according to claim 1, wherein:

each of said at least two adjacent pieces comprise a top surface substantially transverse to the joint surface;

said sensor means is mounted in front of the solid welding material for scanning the joint surfaces and the top surfaces; and said sensor means comprises means for directly mechanically contacting the joint surfaces and the top surfaces before at least a portion of the joint is welded.

3. The method for automatic multi-run welding of a joint according to claim 2, further comprising:

obtaining at least one coordinate of at least one point on each said top surface, said at least one point on each said top surface being in proximity of an intersection of each said top surface and the joint surface;

calculating a plane defined by the top surfaces by using said at least one coordinate of said at least one point;

calculating a line between at least two of said plurality of points on the joint surface; and determining a point of intersection of said line with said plane of the top surfaces, said point of intersection defining an edge point of an edge of the joint at the intersection of the top surface and the joint surface.

4. The method for automatic multi-run welding of a joint according to claim 3, wherein said depositing at least two beads comprises:

depositing at least a first bead of solid welding material along said at least a portion of the joint, said at least a first bead of solid welding material comprising a fixed amount of solid welding material per unit length of the joint;

said at least a portion of the joint comprising a plurality of portions of the joint;

continuously scanning the joint with said sensor means during said depositing of said at least a first bead of solid welding material to directly measure a plurality of points in each of the plurality of portions of the joint; and depositing at least a second bead of solid welding material along the joint by adjusting said at least one of:
said speed of feed, and
said relative speed of movement, during said depositing of said at least a second bead.

5. The method for automatic multi-run welding of a joint according to claim 4, further including:

calculating a cross-sectional area of the first bead of solid welding material;

calculating a cross-sectional area for each portion of the plurality of portions of the joint;

calculating a residual area for each portion of the plurality of portions of the joint, said residual area being the difference between said calculated cross-sectional area of each portion of the joint and said calculated cross-sectional area of the first bead of solid welding material deposited along the joint;

calculating said speed of feed of a solid welding material being fed into the weld for each portion of the joint as a function of said residual area; and calculating said relative speed of movement between the weld head and the two adjacent pieces for each portion of the joint as a function of said residual area.

6. The method for automatic multi-run welding of a joint according to claim 5, further including:

a) using only one of:
said speed of feed of a solid welding material being fed into the weld, and
said relative speed of movement between the weld head and the at least two adjacent pieces, as a welding parameter to control the welding in each the portion of the joint; and b) using the same said welding parameter of step a) to control the welding in each portion of the joint.

7. The method for automatic multi-run welding of a joint according to claim 6, wherein said one welding parameter to control the welding is said relative speed of movement between the weld head and the at east two adjacent pieces.

8. The method for automatic multi-run welding of a joint according to claim 7, further including:

calculating an average cross-sectional area for the joint from each said cross-sectional area of each portion of the joint;

calculating an average relative speed of movement between the weld head and the at least two adjacent pieces for the joint, said average relative speed being a function of said average cross-sectional area; and calculating a relative speed of movement for each portion of the joint as a function of the ratio between said cross-sectional area for the joint portion and said average cross-sectional area; and determining a range of speeds for said relative speed of movement between the weld head and the at least two pieces, said range of speeds comprising a maximum speed above said average relative speed of movement and a minimum speed below said average relative speed of movement.

9. The method for automatic multi-run welding of a joint according to claim 8, further comprising producing a warning signal upon said relative speed of movement at least one of:
exceeding said maximum speed, and
falling below said minimum speed.

10. The method for automatic multi-run welding of a joint according to claim 9, wherein said relative speed of movement for each joint portion is a function of said residual area calculated for the joint portion and said relative speed of movement for each of a preceding joint portion and a following joint portion; and a transition between a first relative speed of movement in a first joint portion and a second relative speed of movement in a second joint portion adjoining the first joint portion is effected gradually when said second relative speed of movement is at least one of: greater than and less than said first relative speed of movement.

11. The method for automatic multi-run welding of a joint according to claim 10, further comprising:
determining a width of each portion of the joint at the base of the portion of the joint;
calculating a width value for each portion of the joint, said width value being equal to $k \cdot b_1$, in which k is a factor with a predetermined value between 0.5 and 1.0 and $b_1$ is the width of each portion, and
calculating an average width value of the joint from the width values of each of the joint portions;

12. The method for automatic multi-run welding of a joint according to claim 11, further including depositing additional beads of solid welding material along the joint to form at least one intermediate layer of beads of weld material, the additional bead being deposited being:
alongside a previous bead of solid welding material when the average width of the joint is greater than a predetermined value,
on top of a previous bead of solid welding material when the average width of the joint is less than a predetermined value, and
on top of a previous bead of solid welding material when the average width of the joint is equal to a predetermined value.

13. The method for automatic multi-run welding of a joint according to claim 12, wherein said plurality of points for each portion of the joint define a polygon;
said polygon being further subdivided into a first and a second subpolygon by a centerline through the joint; and
each said subpolygon comprising the measured points one each respective joint surface and joint edge.

14. The method for automatic multi-run welding of a joint according to claim 13, further including:
calculating a cross-sectional area of each said subpolygon;

calculating a cross-sectional area of a last-deposited bead of welding material;

determining said welding parameters for depositing a bead of solid welding material against a joint surface of a subpolygon as a function of the subpolygon area and of the cross-sectional area of a last-deposited bead in an underlying layer.

15. The method for automatic multi-run welding of a joint according to claim 14, further including:
determining the width ($b_2$) of said intermediate layer of beads of weld material;
depositing a first bead of weld material along one joint surface of the joint;
determining a cross-sectional area ($a_1$) of the first deposited bead of weld material;
determining a height of the first deposited bead of weld material in said intermediate layer for each portion of the joint;
calculating a mean value ($h_1$) for said height of the first deposited bead of weld material;
depositing a second bead of weld material along a second joint surface of the joint;
determining a cross-sectional area ($a_2$) of the second deposited bead of weld material;
calculating a height of said second deposited bead of weld material using the equation $-h_2 = (h_1 \cdot a_2)/2$
calculating an average height value (h) for the first and the second deposited beads of weld material by using the equation $-h = (h_1 + h_2)/2$; and
calculating an average area value for the cross-sectional area of said intermediate layer as a function of the product of said width of said intermediate layer and said average height value.

16. The method for automatic multi-run welding of a joint according to claim 15, further including:
depositing at least three beads of weld material in said intermediate layer when said average area value is greater than a predetermined value;
calculating a number of beads (Z) of weld material to be deposited in said intermediate layer by using the equation $-Z = 2 \cdot b_2 h/(a_1 + a_2)$ and rounding off the resultant value of Z to the nearest integer value;
determining a number of additional beads of weld material to be deposited between the first and the second beads of weld material deposited along the joint surfaces;
determining a cross-sectional area needed for each additional bead of weld material to be deposited between the first and the second beads of weld material by interpolation with respect to the cross-sectional areas $a_1$ and $a_2$ of the first and the second beads of weld material deposited along the joint surfaces, and
depositing the additional beads of weld material in said intermediate layer between the first and the second beads of weld material at a relative speed of movement which is inversely proportional to the cross-sectional area of the additional beads of weld material.

17. The method for automatic multi-run welding of a joint according to claim 16, further comprising, before the deposition of a layer:
calculating a residual area ($R_{pn}$) in each portion of the joint for each layer when the layer is to receive more than two beads of weld material;
calculating an average residual area ($R_{pm}$) for each layer from each of said calculated residual areas;

calculating an average relative speed of movement ($V_{pm}$) as a function of said average residual area;

calculating a residual area ($R_{pn1}$ and $R_{n2}$) for each of said first subpolygon and said second subpolygon; and calculating the relative speed of movement for the deposition of the first and second beads of weld material by using the equations:

$$V_{pn1} = (V_{pm} \cdot R_{pm})/2R_{pn1} \text{ and } V_{pn2} = (V_{pm} \cdot R_{pm})/2R_{pn2}.$$

18. The method for automatic multi-run welding of a joint according to claim 16, further comprising:

calculating a quotient for each portion of the joint in a last-deposited intermediate layer from the average residual area of each portion of the joint in the last-deposited intermediate layer and said average area value of the cross-sectional area in each portion of the joint in the last-deposited intermediate layer; and depositing a top layer of beads of weld material in the joint on the last-deposited intermediate layer when said quotient is less than a predetermined value, the top layer of beads of weld material containing one more bead of weld material than the last-deposited intermediate layer.

19. Apparatus for automatic multi-run welding of a joint formed between at least two adjacent pieces to be welded by a weld head to form a weld, each of the at least two adjacent pieces comprising a joint surface, each joint surface being disposed for being welded to at least one adjacent joint surface, said apparatus comprising:

a welding housing;

a weld head disposed on the welding housing, the weld head comprising means for receiving a solid welding medium and means for feeding the solid welding medium to the weld;

a welding power supply for providing current for the weld head;

means for providing relative movement between the weld head and the at least two adjacent pieces;

sensor means for scanning at least a portion of the joint, said sensor means being for directly measuring a plurality of actual points on each said joint surface to generate data corresponding to coordinates of said points;

means for oscillating said sensor means transverse to a longitudinal axis of the joint to scan each said joint surface during at least a half-oscillation of said sensor means within said joint;

processing means for receiving said data corresponding to coordinates of said points, for calculating the cross-sectional area of the joint from said data corresponding to coordinates of said points, for calculating at least one of:

a speed of feed of the solid welding medium into the weld, and a relative speed of movement between the weld head and the at least two adjacent pieces, and for producing signals for control of the welding; said apparatus further comprising at least one of:

means for controlling the means for feeding the weld rod to control the amount of solid welding material being fed into the weld, and means for controlling the means for providing relative movement between the weld head and the at least two pieces to control the amount of solid welding material being deposited along the joint; and control means for receiving said signals for control of the welding, and for controlling at least one of:

said means for controlling the means for feeding the weld rod to control the amount of solid welding material being fed into the weld, and said means for controlling the means for providing relative movement between the weld head and the at least two pieces to control the amount of solid welding material being deposited along the joint.

20. The apparatus for automatic multi-run welding of a joint according to claim 19, wherein:

said sensor means is mounted in front of the weld head for scanning at least a portion of the joint before the welding of at least a portion of the joint; and said sensor means comprises means for directly mechanically contacting each said joint surface during oscillation of said sensor means to measure said plurality of points.

* * * * *

UNITED STATES PATENT AND TRADEMARK OFFICE
CERTIFICATE OF CORRECTION

PATENT NO. : 5,166,495

DATED : November 24, 1992

INVENTOR(S) : Bengt EKELÖF and Peter HANSSON

Page 1 of 4

It is certified that error appears in the above-indentified patent and that said Letters Patent is hereby corrected as shown below:

In column 1, line 38, after 'and', delete "filed" and insert --filled--.

In column 6, line 37, after 'at', delete "east" and insert --least--.

In column 6, line 42, after 'at', delete "east" and insert --least--.

In column 6, line 47, after 'at', delete "east" and insert --least--.

In column 6, line 50, after 'at', delete "east" and insert --least--.

In column 6, line 53, after 'at', delete "east" and insert --least--.

In column 6, line 62, before 'one', delete "east" and insert --least--.

In column 7, line 9, after 'at', delete "east" and insert --least--.

In column 7, line 12, after 'at', delete "east" and insert --least--.

In column 7, line 18, after 'at', delete "east" and insert --least--.

UNITED STATES PATENT AND TRADEMARK OFFICE
CERTIFICATE OF CORRECTION

PATENT NO. : 5,166,495
DATED : November 24, 1992
INVENTOR(S) : Bengt EKELÖF and Peter HANSSON It is certified that error appears in the above-indentified patent and that said Letters Patent is hereby corrected as shown below:

In column 9, line 59, after 'beads', delete "36" and insert --34--.

In column 10, line 47, after 'through', delete "al" and insert --all--.

In column 14, the first line, delete the entire equation and insert the following:
$$--\underline{V}_{pn} = (\underline{V}_{pm} \cdot \underline{R}_{pm})/\underline{R}_{pn}, --.$$

In column 14, line 33, in the first equation, delete "$R_{3n1}$" and insert --$\underline{R}_{3n1}$--.

In column 14, line 33, in the second equation, after 'and', delete "$R_{3n2}$" and insert --$\underline{R}_{3n2}$--.

In column 14, line 48, delete the entire equation and insert the following:
$$--\underline{V}_{pn1} = (\underline{V}_{pm} \cdot \underline{R}_{pm})/2 \cdot \underline{R}_{pn1}, \quad \underline{V}_{pn2} = (\underline{V}_{pm} \cdot \underline{R}_{pm})/2 \cdot \underline{R}_{pn2}, --.$$

In column 14, line 52, delete the entire equation and insert the following:
$$--\underline{V}_{3n1} = (\underline{V}_{3m} \cdot \underline{R}_{3m})/2 \cdot \underline{R}_{3n1}, \quad \underline{V}_{3n2} = (\underline{V}_{3m} \cdot \underline{R}_{3m})/2 \cdot \underline{R}_{3n2}, --.$$

In column 15, line 19, after 'which', delete "b" and insert --$b_2$--.

In column 15, line 20, after '=', delete "$(h_1 h_2)$" and insert --$(h_1 + h_2)$--.

UNITED STATES PATENT AND TRADEMARK OFFICE
CERTIFICATE OF CORRECTION

PATENT NO. : 5,166,495
DATED : November 24, 1992
INVENTOR(S) : Bengt EKELÖF and Peter HANSSON It is certified that error appears in the above-indentified patent and that said Letters Patent is hereby corrected as shown below:

In column 16, line 49, in the equation, after the comma, delete "$R_{pn}$" and insert --$\underline{R}_{pn}$--.

In column 16, line 50, in the equation, before the first occurrence of '=', delete "$R_{pn1}$" and insert --$\underline{R}_{pn1}$--.

In column 16, line 50, in the equation, after the comma, delete "$R_{pn2}$" and insert --$\underline{R}_{pn2}$--.

In column 16, line 59, in the equation, after the comma, delete "$R_{pn}$" and insert --$\underline{R}_{pn}$--.

In column 16, line 60, in the equation, before the first occurrence of '=', delete "$R_{pn1}$" and insert --$\underline{R}_{pn1}$"--.

In column 16, line 60, in the equation, after the comma, delete "$R_{pn2}$" and insert --$\underline{R}_{pn2}$--.

In column 17, line 6, delete the entire equation and insert the following:
--$\underline{V}_{pn1} = (\underline{V}_{pm} \cdot \underline{R}_{pm})/2\underline{R}_{pn1}$, $\underline{V}_{pn2} = (\underline{V}_{pm} \cdot \underline{R}_{pm})/2 \cdot \underline{R}_{pn2}$--.

In column 19, line 56, after '=', delete "$(h_1 h_2)$" and insert --$(h_1 + h_2)$--.

In column 20, line 32, delete the entire equation and insert the following:
--$\underline{V}_{pn1} = (\underline{V}_{pm} \cdot \underline{R}_{pm})/2 \cdot \underline{R}_{pn1}$ and $\underline{V}_{pn2} = (\underline{V}_{pm} \cdot \underline{R}_{pm})/2 \cdot \underline{R}_{pn2}$,--.

UNITED STATES PATENT AND TRADEMARK OFFICE
CERTIFICATE OF CORRECTION

PATENT NO. : 5,166,495
DATED : November 24, 1992
INVENTOR(S) : Bengt EKELÖF and Peter HANSSON It is certified that error appears in the above-indentified patent and that said Letters Patent is hereby corrected as shown below:

In column 21, line 43, Claim 2, after 'automatic', delete "multi-fun" and insert --multi-run--.

In column 22, line 58, Claim 7, after 'at', delete "east" and insert --least--.

In column 25, line 3, Claim 17, after 'and', delete "$R_{n2}$)" and insert --$R_{pn2}$)--.

In column 25, line 10, Claim 17, delete the entire equation and insert the following:
--$V_{pn1} = (V_{pm} \cdot R_{pm})/2R_{pn1}$ and $V_{pn2} = (V_{pm} \cdot R_{pm})/2R_{pn2}$.--

Signed and Sealed this

First Day of October, 1996

Attest:

BRUCE LEHMAN

Attesting Officer

Commissioner of Patents and Trademarks